(12) United States Patent
Honda (10) Patent No.: US 9,546,624 B2
(45) Date of Patent: Jan. 17, 2017

(54) FUEL SUPPLY SYSTEM

(71) Applicant: AISAN KOGYO KABUSHIKI KAISHA, Obu-shi, Aichi-ken (JP)

(72) Inventor: Yoshihiko Honda, Obu (JP)

(73) Assignee: AISAN KOGYO KABUSHIKI KAISHA, Obu-Shi, Aichi-Ken (JP)

( * ) Notice: Subject to any disclaimer, the term of this patent is extended or adjusted under 35 U.S.C. 154(b) by 71 days.

(21) Appl. No.: 14/740,679

(22) Filed: Jun. 16, 2015

(65) Prior Publication Data

US 2015/0361936 A1  Dec. 17, 2015

(30) Foreign Application Priority Data

Jun. 17, 2014 (JP) .................. 2014-124308

(51) Int. Cl.
| | |
|---|---|
| *F02M 37/00* | (2006.01) |
| *F02M 37/02* | (2006.01) |
| *F02M 37/22* | (2006.01) |
| *B60K 15/03* | (2006.01) |
| *F02M 37/10* | (2006.01) |

(52) U.S. Cl.
CPC .......... *F02M 37/0088* (2013.01); *B60K 15/03* (2013.01); *F02M 37/007* (2013.01); *F02M 37/02* (2013.01); *F02M 37/025* (2013.01); *F02M 37/106* (2013.01); *F02M 37/22* (2013.01); *B60K 2015/0325* (2013.01); *B60K 2015/03111* (2013.01); *B60K 2015/03236* (2013.01); *B60K 2015/03243* (2013.01)

(58) Field of Classification Search
CPC .................................. F02M 37/106
USPC ................................. 123/509, 467
See application file for complete search history.

(56) References Cited

U.S. PATENT DOCUMENTS

| | | | | |
|---|---|---|---|---|
| 3,824,974 A | * | 7/1974 | La Flame | F02M 37/08 123/511 |
| 4,672,937 A | * | 6/1987 | Fales | F02M 37/08 123/495 |
| 5,368,001 A | * | 11/1994 | Roche | B01D 35/027 123/510 |
| 6,092,500 A | * | 7/2000 | Frank | F02B 77/08 123/198 D |
| 6,155,793 A | * | 12/2000 | Tuckey | F02M 37/025 123/509 |
| 6,158,975 A | * | 12/2000 | Dill | F02M 37/14 123/509 |

(Continued)

FOREIGN PATENT DOCUMENTS

| | | |
|---|---|---|
| JP | 2001-520724 A | 10/2001 |
| JP | 2010-71098 A | 4/2010 |

*Primary Examiner* — Thomas Moulis
(74) *Attorney, Agent, or Firm* — Conley Rose, P.C.

(57) ABSTRACT

A fuel supply system for a vehicle having an internal combustion engine and a fuel tank, has a reservoir, a fuel pump, a suction filter, a fuel transfer and a pressure accumulator. The reservoir is located in the fuel tank and is hermetically sealed. The fuel pump is configured to suck fuel from the reservoir and to supply the fuel to the internal combustion engine. The suction filter is configured to filter the fuel sucked by the fuel pump. The fuel transfer is configured to transfer the fuel from the fuel tank into the reservoir and to pressurize the fuel in the reservoir. The pressure accumulator is connected to the reservoir in order to control a pressure of the fuel in the reservoir.

4 Claims, 7 Drawing Sheets

(56) References Cited

U.S. PATENT DOCUMENTS

| | | | | |
|---|---|---|---|---|
| 6,260,543 B1* | 7/2001 | Chih | ................... | B01D 35/027 |
| | | | | 123/509 |
| 6,279,544 B2* | 8/2001 | Rumpf | ........................ | 123/458 |
| 6,341,623 B1* | 1/2002 | Channing | ............ | B60K 15/077 |
| | | | | 123/514 |
| 6,497,215 B1* | 12/2002 | Gaessler | ................ | F02M 59/18 |
| | | | | 123/179.16 |
| 6,655,366 B2* | 12/2003 | Sakai | ..................... | F02M 37/20 |
| | | | | 123/509 |
| 6,889,665 B2* | 5/2005 | Rembold | ............... | F02M 59/06 |
| | | | | 123/495 |
| 2003/0033796 A1* | 2/2003 | Dixon | .................... | F02C 7/228 |
| | | | | 60/39.281 |
| 2003/0192599 A1* | 10/2003 | Aoyama | ............. | F02M 37/106 |
| | | | | 137/565.16 |
| 2004/0173187 A1* | 9/2004 | Kanamaru | ......... | B01D 35/0273 |
| | | | | 123/509 |
| 2005/0126546 A1* | 6/2005 | Yagisawa | ................ | B62J 35/00 |
| | | | | 123/509 |

\* cited by examiner

FUEL SUPPLY SYSTEM

CROSS-REFERENCE TO RELATED APPLICATIONS

This application claims priority to Japanese patent application Ser. No. 2014-124308, filed Jun. 17, 2014, the contents of which are incorporated herein by reference.

STATEMENT REGARDING FEDERALLY SPONSORED RESEARCH OR DEVELOPMENT

Not applicable.

BACKGROUND

This disclosure relates to a fuel supply system for supplying fuel from a fuel tank to an internal combustion engine of a vehicle such as automobile.

Japanese Laid-Open Patent Publication No. 2010-71098 discloses a conventional fuel supply system. The fuel supply system has a reservoir cup, a reservoir lid, a fuel supply pipe, an electric wire, and a jet pump. The reservoir cup houses a fuel pump therein and is configured to reserve fuel in the fuel tank. The reservoir lid covers an upper opening of the reservoir cup. The fuel pump pumps fuel from the fuel tank through the fuel supply pipe to the outside of the fuel tank. The electric wire is connected to the fuel supply pump. The jet pump sends fuel from the fuel tank into the reservoir. The reservoir lid has an opening where the fuel supply pipe and the electric wire are inserted. Here, the reservoir is composed of the reservoir cup and the reservoir lid.

According to the fuel supply system, in a condition that the fuel supply pipe and the electric wire are inserted into the opening of the reservoir lid, an opening area between the reservoir lid, the fuel supply pipe and the electric wire is not decreased. Thus, it is not able to pressurize the inner space of the reservoir. Therefore, because the fuel and the air in the reservoir are sucked into a suction filter only by suction power of the fuel pump, there is a possibility that pressure loss of the suction filter increases, and that the load of the fuel pump increases. The increase of the load of the fuel pump may decrease efficiency and machine life of the fuel pump. Accordingly, there has been a need for improved fuel supply systems.

BRIEF SUMMARY

In one aspect of this disclosure, a fuel supply system for a vehicle having an internal combustion engine and a fuel tank, has a reservoir, a fuel pump, a suction filter, a fuel transfer and a pressure accumulator. The reservoir is located in the fuel tank and is hermetically sealed. The fuel pump is configured to suck fuel from the reservoir and to supply the fuel to the internal combustion engine. The suction filter is configured to filter the fuel sucked by the fuel pump. The fuel transfer is configured to transfer the fuel from the fuel tank into the reservoir and to pressurize the fuel in the reservoir. The pressure accumulator is connected to the reservoir in order to control a pressure of the fuel in the reservoir.

According to the aspect of this disclosure, because the fuel in the reservoir is pressurized, the fuel is pressed into the suction filter from the reservoir. Thus, an increase in the pressure loss caused by clogging of the suction filter can be prevented, and a decrease in the fuel suction amount of the suction filter can be prevented. The pressure accumulator controls the pressure of the fuel in the reservoir. Accordingly, even when the fuel pressure in the reservoir decreases due to an increase in a fuel consumption of the internal combustion engine or a decrease of a transfer fuel amount by the fuel transfer, the pressure accumulator pressurizes the fuel in the reservoir such that the fuel in the reservoir is pressed into the suction filter. Therefore, a pressure loss of the suction filter can be decreased, and a load on the fuel pump and a suction negative pressure of the fuel pump can be decreased. Further, a machine life of the suction filter can be improved due to the decrease in the pressure loss of the suction filter. And, the decrease in the load on the fuel pump can improve an efficiency of the fuel pump, decrease a power consumption, and prevent a generation of a vapor lock.

DETAILED DESCRIPTION

Each of the additional features and teachings disclosed above and below may be utilized separately or in conjunction with other features and teachings to provide improved fuel supply systems. Representative examples, which utilize many of these additional features and teachings both separately and in conjunction with one another, will now be described in detail with reference to the attached drawings. This detailed description is merely intended to teach a person of skilled in the art further details for practicing preferred aspects of the present teachings and is not intended to limit the scope of the invention. Only the claims define the scope of the claimed invention. Therefore, combinations of features and steps disclosed in the following detailed description may not be necessary in the broadest sense, and are instead taught merely to particularly describe representative examples. Moreover, various features of the representative examples and the dependent claims may be combined in ways that are not specifically enumerated in order to provide additional useful embodiments of the present teachings.

Figure 1:
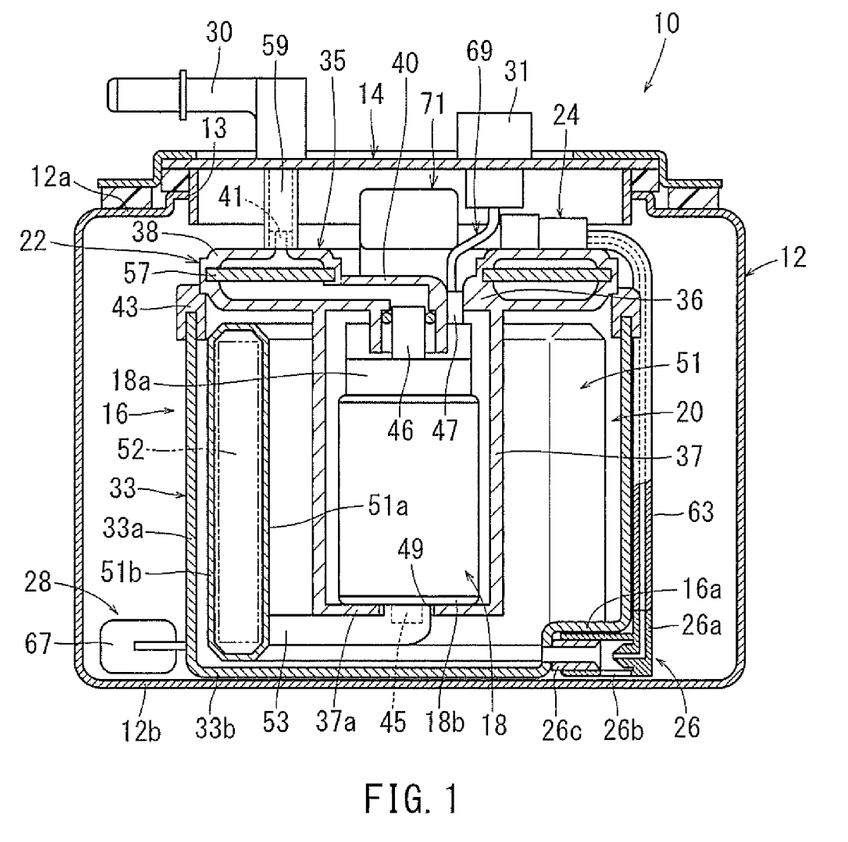
FIG. 1 is a sectional front view of a fuel supply system according to a first embodiment.
Figure 2:
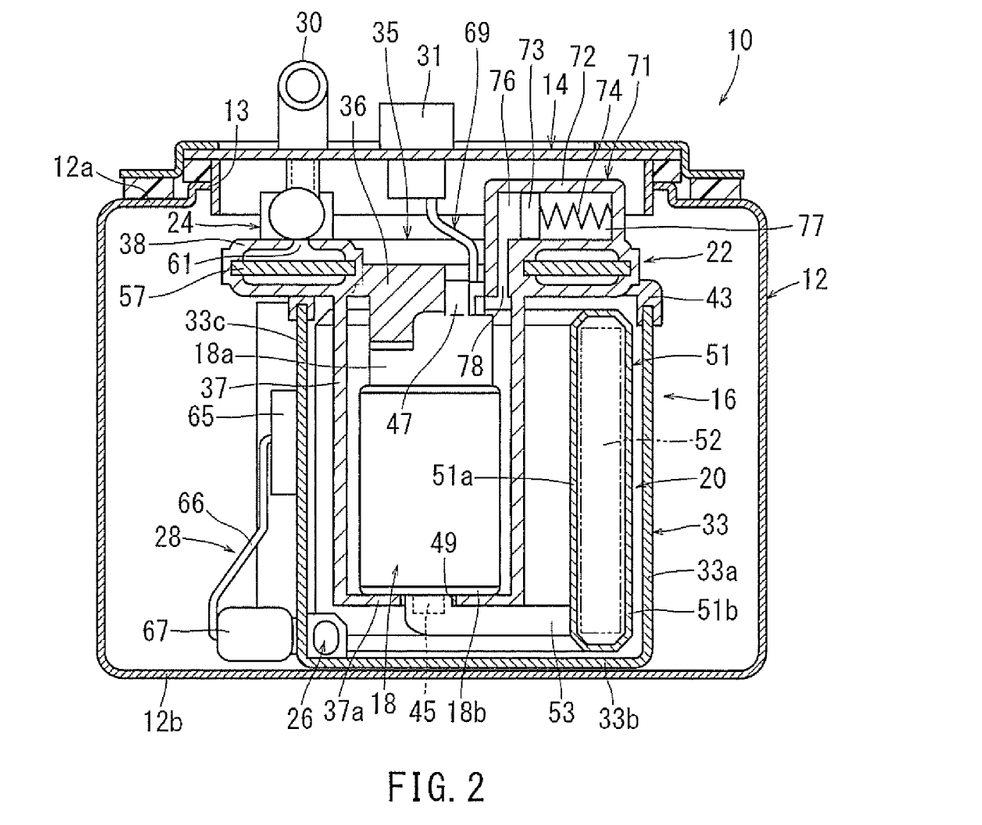
FIG. 2 is a sectional side view of the fuel supply system.
Figure 3:
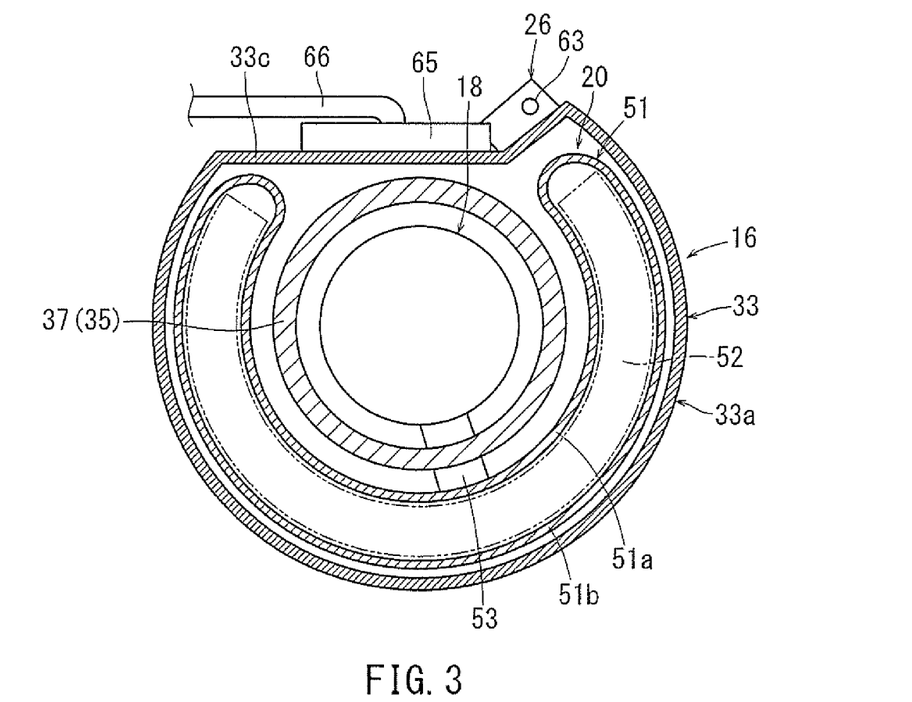
FIG. 3 is a sectional plan view of a reservoir.

A first embodiment of the fuel supply system will be described. FIGS. 1-3 are a sectional front view, a sectional side view and a sectional plan view of the fuel supply system, respectively. As shown in FIG. 1, a fuel supply system 10 is attached to a fuel tank 12 of, for example, an automobile and is configured to supply fuel from the fuel tank 12 to an internal combustion engine (engine). An upper wall 12$a$ of the fuel tank 12 has an opening 13.

The fuel supply system 10 has a set plate 14, a reservoir 16, a fuel pump 18, a suction filter 20, a high pressure filter 22, a pressure regulator 24, a jet pump 26, and a sender gauge 28. The set plate 14 is mounted on the upper plate 12$a$ for covering the opening 13 of the fuel tank 12. The set plate 14 has a fuel discharge pipe 30 and an external coupling electric connector 31. The fuel discharge pipe 30 is connected to the internal combustion engine, in detail, to an injector via a fuel supply pipe (not shown). The external coupling electric connector 31 is connected to both an external source and an electric control unit (ECU) via an external connector (not shown). Here, the set plate 14 corresponds to "lid" in this disclosure.

The reservoir 16 is hermetically composed of a reservoir cup 33 and a cover 35. The reservoir cup 33 is formed in a hollow cylinder shape having an upper opening and a lower closed bottom and is made from resin materials. The cover 35 is made from resin materials and is formed to close the upper opening of the reservoir cup 33. The reservoir 16 houses the fuel pump 18 and the suction filter 20 therein. The reservoir 16 is inserted into the fuel tank 12 through the opening 13 and is mounted on a bottom wall 12b of the fuel tank 12. A bottom wall 33b of the reservoir 16 contacts an upper surface of the bottom wall 12b of the fuel tank 12 in a surface contact condition.

The cover 35 has a cover portion 36, a pump case portion 37, and a filter case portion 38. The cover portion 36 is formed in a circular plate shape. The pump case portion 37 is formed in a hollow cylinder shape extending downward from a center region of the cover portion 36 and having a lower closed bottom. The filter case portion 38 is formed in a flattened hollow ring shape at an outer circumference of the cover portion 36. The filter case 38 is a part of the cover portion 36.

At an inner circumference of the filter case portion 38, a fuel inlet port 40 for introducing the fuel is formed. At an upper surface of the filter case portion 38, a fuel outlet port 41 for discharging the fuel is formed. Here, the cover 35 can be made by separately forming the cover portion 36 (including the filter case portion 38) and the pump case portion 37 and then integrating them by snap-fit, welding or the like. Further, the cover 35 can be made by separately forming the cover portion 36 and the filter case portion 38 and then integrating them by snap-fit, welding or the like. The cover portion 36 and the filter case portion 38 can be separately formed and then can be integrated with each other by snap-fit, welding or the like.

The cover 35 is attached to the reservoir cup 33 for closing the upper opening of the reservoir cup 33. The upper opening of the reservoir cup 33 is mainly closed with the cover portion 36 (including the filter case portion 38). A seal member 43 is attached to an upper end of a circumferential wall 33a of the reservoir cup 33. The seal member 43 seals between the circumferential wall 33a of the reservoir cup 33 and the cover portion 36 (including the filter case portion 38) of the cover 35. Here, the cover portion 36 (including the filter case portion 38) of the cover 35 can be pressed into the circumferential wall 33a of the reservoir cup 33 or can be hermetically contacted on the circumferential wall 33a of the reservoir cup 33 due to the weight of the cover 35 and the weight of the fuel pump 18, etc. In this case, the seal member 43 can be omitted.

The fuel pump 18 is a motor integrated pump where an electric motor and an impeller pump are installed vertically. When the impeller of the pump is rotated by the operation of the motor, the pump sucks, pressurizes, and discharges the fuel. At a lower end 18b of the fuel pump 18, a fuel inlet port 45 projecting downward is provided. At an upper end 18a of the fuel pump 18, a fuel outlet port 46 projecting upward and an electric connector 47 are provided. The pump case portion 37 of the cover 35 houses the fuel pump 18 therein such that the fuel pump 18 is mounted vertically. The fuel inlet port 45 is fitted into a fitting hole 49 formed in a bottom plate 37a of the pump case portion 37.

As shown in FIG. 3, the suction filter 20 has a filter member 51, a frame 52 and a connecting pipe 53. The filter member 51 is formed in a C-type cylinder shape having a C-shape in a plan view. The filter member 51 is formed in a bag shape having an inner circumferential filter portion 51a and an outer circumferential filter portion 51b. The frame 52 is provided between the inner circumferential filter portion 51a and the outer circumferential filter portion 51b of the filter member 51 for holding the distance between the filter portions 51a and 51b. The connecting pipe 53 is connected to both a lower end of the filter portion 51a of the filter member 51 and a lower end of the frame 52, and extends in a radial direction of the filter member 51 (see FIGS. 1 and 2). The connecting pipe 53 is communicated with an inner space of the inner circumferential filter portion 51a.

The suction filter 20 is positioned to surround the pump case portion 37 below the filter case portion 38 of the cover 35 with respect to the inside of the reservoir cup 33 of the reservoir 16. A predetermined distance is held between the circumferential wall 33a of the reservoir cup 33 and the outer circumferential filter portion 51b of the filter member 51. A predetermined distance is held between the inner circumferential filter portion 51a of the filter member 51 and the pump case portion 37. An end of the connecting pipe 53 is connected to the fuel inlet port 45 of the fuel pump 18 (see FIGS. 1 and 2). The filter member 51 can be formed to surround the entirety or nearly the entirety of the pump case portion 37 or can be formed to have a bottom closing or partially closing a lower opening of the filter member 51.

The circumferential wall 33a of the reservoir cup 33 includes a flat plate-shaped wall portion 33c not corresponding to the filter member 51 of the suction filter 20 (see FIG. 2). The circumferential wall 33a including the flat plate-shaped wall portion 33c of the reservoir cup 33 is formed in a D-shape in a plan view (see FIG. 3). The flat plate-shaped wall portion 33c is positioned near the pump case portion 37.

As shown in FIG. 1, a ring plate shaped filter 57 is provided horizontally in the filter case portion 38 of the cover 35. Thus, the high pressure filter 22 is composed. The filter case portion 38 is formed by holding the filter member 57 between an upper half and a lower half and then engaging the halves with each other by welding. The fuel inlet port 40 of the filter case portion 38 is communicated with the inner space of the lower half and is connected to the fuel outlet port 46 of the fuel pump 18. The fuel outlet port 41 of the filter case portion 38 is communicated with the inner space of the upper half and is connected to the fuel discharge pipe 30 of the set plate 14 via a connecting pipe 59.

The filter member 57 is made from the same material of the filter member 51 of the suction filter 20. The filter member 51 of the suction filter 20 and the filter member 57 of the high pressure filter 22 are set, for example, to be capable of trapping 90% or more of foreign materials having a diameter larger than 40 micrometer, which a strainer of the injector can trap. Alternately, the filter member 51 of the suction filter 20 is set to trap foreign materials having a diameter equal to or smaller than those trapped by the filter member 57 of the high pressure filter 22. Thus, an increase of pressure loss caused by clogging of the filter member 57 having a smaller filtration area than the filter member 51 can be prevented. Here, the filter member 51 can be set to trap foreign materials having the diameter larger than those trapped by the filter member 57. Further, the filter member 57 can be made from a different material from that of the filter member 51.

The filter member 51 of the suction filter 20 is formed in a substantial hollow cylinder shape. The filter case portion 38 of the high pressure filter 22 is formed in a flattened shape. The high pressure filter 22 is positioned above the suction filter 20. Accordingly, the filtration area of the filter member 51 of the suction filter 20 can be increased while preventing an increase in the height of the reservoir 16.

The pressure regulator 24 is mounted on the filter case portion 38 of the cover 35. The filter case portion 38 has a connection port 61 formed in the upper wall of the filter case portion 38 and communicated with the inner space of the upper half of the filter case portion 38 (see FIG. 2). The connection port 61 is connected with a fuel inlet port (not shown) of the pressure regulator 24. The pressure regulator 24 controls the inner pressure of the filter case portion 38 and discharges surplus fuel.

The jet pump 26 is positioned in a recess 16a formed in a lower surface of the bottom of the reservoir 16. A drive fuel inlet 26a of the jet pump 26 is connected to the pressure regulator 24, in detail a surplus fuel outlet (not shown), via a return pipe 63. A transfer fuel inlet 26b of the jet pump 26 opens to the inside of the fuel tank 12, that is, the outside of the reservoir 16. A fuel outlet 26c of the jet pump 26 is connected to the inside of the reservoir cup 33 of the reservoir 16. The jet pump 26 utilizes surplus fuel discharged from the pressure regulator 24 as drive fuel to transfer, that is, to pump the fuel from the inside of the fuel tank 12 (outside the reservoir 16) to the inside of the reservoir 16. Thus, the reservoir 16 is filled with the fuel. The fuel discharged from the reservoir 16 corresponds to the fuel supplied to the internal combustion engine by the fuel pump 18 and the fuel flowing out from the inside of the reservoir 16 into the fuel tank 12. Here, the jet pump 26 corresponds to "fuel transfer" in this disclosure.

As shown in FIG. 2, the sender gauge 28 has a gauge body 65, an arm 66 and a float 67. The gauge body 65 is attached to an outer facing surface of the flat plate-shaped wall portion 33c of the circumferential wall 33a of the reservoir cup 33 of the reservoir 16. The arm 66 is arranged on the gauge body 65 and is configured to rotate vertically. The float 67 is attached to a free end of the arm 66 and is configured to be able to float on a liquid surface in the fuel tank 12. The sender gauge 28 is a liquid level meter detecting a remaining fuel, that is, the level of the fuel in the fuel tank 12 based on an electric resistance value and is configured to output detection signals to the ECU. The sender gauge 28 is connected to the external coupling electric connector 31 of the set plate 14 via a wire (not shown). The external coupling electric connector 31 of the set plate 14 is connected to an electric connector 47 of the fuel pump 18 via a harness 69 (see FIG. 2).

At an upper end of the reservoir 16, for example, at the cover portion 36 of the cover 35, a fuel discharge opening (not shown) is formed. When the fuel overflows from the inside of the reservoir 16, the fuel is discharged via the fuel discharge opening into the inside of the fuel tank 12. The fuel discharge opening can function as vent hole. The open area of the fuel discharge opening is configured to make the fuel discharge amount from the inside of the reservoir 16 smaller than the fuel transfer amount by the jet pump 26. The fuel transfer amount includes the surplus fuel amount (the drive fuel amount) from the pressure regulator 24. Here, the fuel discharge opening can be composed of one or more openings.

As shown in FIG. 2, at the upper end of the reservoir 16, for example, at an upper surface of the filter case portion 38 of the cover 35, a pressure accumulator 71 is horizontally located. The pressure accumulator 71 has a cylinder portion 72, a piston 73, and a spring 74. The cylinder portion 72 is formed on an upper surface side of the filter case portion 38 of the cover 35. The piston 73 is slidably arranged in the cylinder portion 72. The piston 73 divides an inner space of the cylinder portion 72 into a pressure accumulation chamber 76 and a back pressure chamber 77. When the piston 73 moves in the cylinder portion 72, the piston 73 changes the volume of the pressure accumulation chamber 76.

A communication path 78 is communicated with the pressure accumulation chamber 76. The communication path 78 extends downward from the cylinder portion 72 and is opened near the upper end of the fuel pump 18. Thus, the pressure accumulation chamber 76 is communicated with the inner space of the reservoir 16 via the communication path 78. The spring 74 is composed of, for example, a coil spring, and is located between opposite faces of the back pressure chamber 77 and the piston 73. The spring 74 biases the piston 73 in a direction for decreasing the volume of the pressure accumulation chamber 76 (leftward in FIG. 2).

When the fuel pressure in the reservoir 16 becomes high, the piston 73 is moved in a direction for decreasing the volume of the back pressure chamber 77, that is, for increasing the volume of the pressure accumulation chamber 76 (rightward in FIG. 2) against a biasing force of the spring 74 such that the pressure accumulator 71 stores fuel pressure of the reservoir 16. Then, when the fuel pressure in the reservoir 16 decreases, the piston 73 is moved in the direction for decreasing the volume of the pressure accumulation chamber 76 (leftward in FIG. 2) due to the biasing force of the spring 74 such that the fuel is discharged from the pressure accumulation chamber 76 into the reservoir 16. Here, the piston 73 corresponds to "volume variable member" in this disclosure. The spring 74 corresponds to "elastic material" in this disclosure.

The operation of the fuel supply system 10 will be described. When the fuel pump 18 is driven, the fuel in the reservoir 16 is sent to the filter member 51 of the suction filter 20 and is filtered by the filter member 51, and then is sucked into the fuel pump 18 through the connecting pipe 53. The fuel is pressurized by the fuel pump 18 and is discharged to the high pressure filter 22 via the fuel outlet port 46. The fuel is filtered by the filter member 57 of the high pressure filter 22. Then, the pressure of the fuel is adjusted by the pressure regulator 24 depending on the operating condition of the internal combustion engine. The adjusted fuel is supplied to the internal combustion engine via the connecting pipe 59, the fuel discharge pipe 30 of the set plate 14 and the fuel supply pipe (not shown).

The surplus fuel discharged from the pressure regulator 24 is returned into the reservoir 16 via the jet pump 26. The fuel in the fuel tank 12, i.e., outside the reservoir 16 is transferred, that is, pumped into the reservoir 16 by the jet pump 26. The amount of the fuel discharged from the inside of the reservoir 16 via the fuel discharge opening is smaller than the amount of the fuel transferred by the jet pump 26 (including the drive fuel amount). Accordingly, the inner space of the reservoir 16 is filled with the fuel, and the fuel is pressurized.

According to the fuel supply system 10, the fuel in the reservoir 16 is pressurized due to the transfer pressure of the fuel applied by the jet pump 26. In the result, the fuel in the reservoir 16 is pressed into the suction filter 20. Thus, the increase in the pressure loss caused by clogging of the suction filter 20 can be prevented. And, the decrease in the amount of the fuel sucked by the suction filter 20 can be prevented.

When the fuel pressure in the reservoir 16 increases, for example, becomes higher than a first predetermined value, the pressure accumulator 71 accumulates the fuel pressure. Then, when the fuel pressure in the reservoir 16 decreases, for example, becomes lower than a second predetermined value, the pressure accumulator 71 discharges the fuel into the reservoir 16. Thus, even when the fuel pressure in the reservoir 16 decreases due to an increase in the fuel consumption of the internal combustion engine, a decrease in the fuel transfer amount by the jet pump 26 or the like, the fuel in the reservoir 16 is pressurized due to fuel pressure in the pressure accumulator 71 such that the fuel in the reservoir 16 is pressed into the suction filter 20.

Accordingly, the pressure loss of the suction filter 20 can be decreased, and the load on the fuel pump 18 and the suction negative pressure of the fuel pump 18 can be decreased due to a pressurization effect of the fuel in the reservoir 16 by the jet pump 26 and a pressurization effect of the fuel in the reservoir 16 by the pressure accumulator 71. And, because the pressure loss of the suction filter 20 is decreased, the machine life of the suction filter 20 can be extended. Further, because the load on the fuel pump 18 is decreased, the efficiency of the fuel pump 18 can be improved, the power consumption of the fuel pump 18 can be decreased, and a generation of the vapor lock can be prevented.

The piston 73 of the pressure accumulator 71 changes the volume of the pressure accumulation chamber 76. Thus, when the fuel pressure in the reservoir 16 becomes high, the pressure accumulator 71 can accumulate the fuel pressure. Then, when the fuel pressure in the reservoir 16 decreases, the pressure accumulator 71 can discharge the fuel into the reservoir 16.

The jet pump 26 can be used as the fuel transfer. The jet pump 26 does not include any mechanical movable part, so that its configuration can be simplified.

When one member is used for the cover 35 of the reservoir 16, a pump case (the pump case portion 37) holding the fuel pump 18, and a filter case (the filter case portion 38) of the high pressure filter 22, the number of components and the number of assembly work can be decreased.

Figure 4:
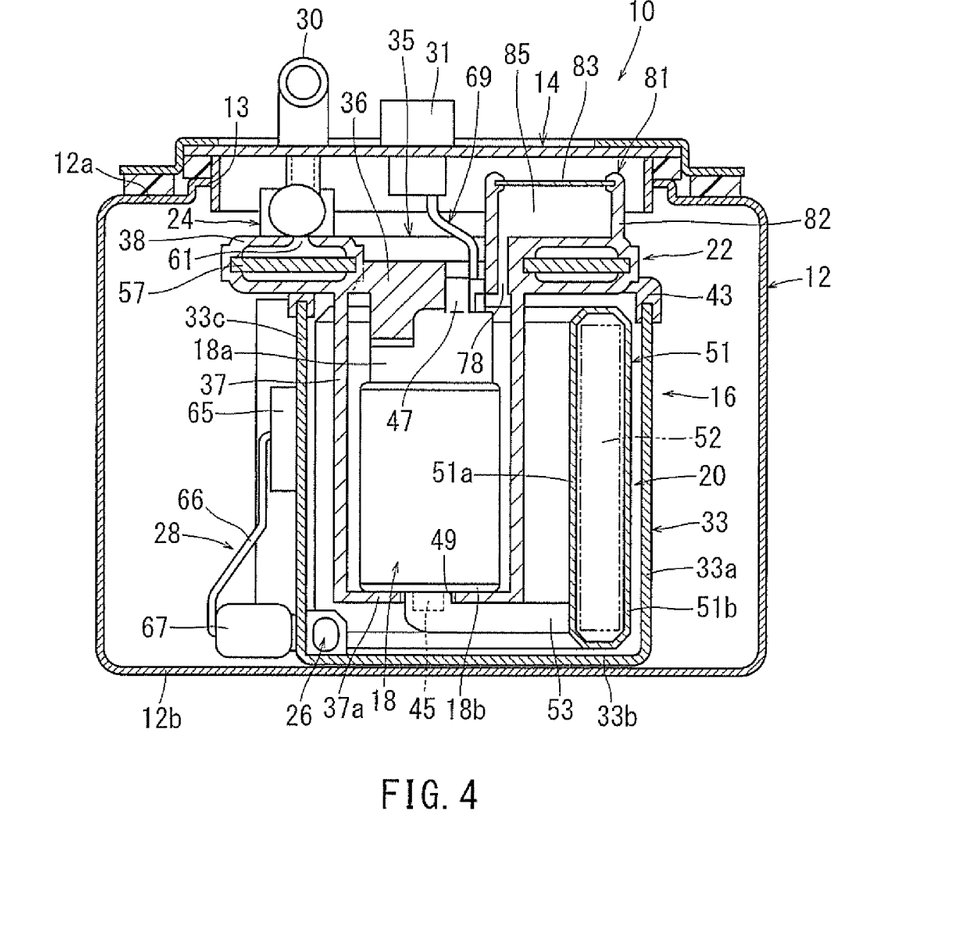
FIG. 4 is a sectional side view of the fuel supply system according to a second embodiment.

A second embodiment will be described. Following embodiments correspond to the first embodiment with some changes. Thus, the changes will be described, and the same configuration will not be described again. FIG. 4 is a sectional side view of the fuel supply system 10 of the second embodiment. As shown in FIG. 4, the fuel supply system 10 of this embodiment has a pressure accumulator 81. The pressure accumulator 81 has a hollow cylindrical wall 82 and a diaphragm 83. The hollow cylindrical wall 82 has a bottom. The hollow cylindrical wall 82 is formed on the upper surface side of the filter case portion 38 of the cover 35. The hollow cylindrical wall 82 is shaped vertically and is opened upward.

The diaphragm 83 is made from a rubber-like elastic material having flexible and stretching properties. A circumference of the diaphragm 83 is engaged with the whole circumference of an upper end of the hollow cylindrical wall 82. The hollow cylindrical wall 82 and the diaphragm 83 form a sealed pressure accumulation chamber 85. When the diaphragm 83 elastically deforms into a balloon shape, the volume of the pressure accumulation chamber is changed. The communication path 78 is communicated with the pressure accumulation chamber 85 and extends downward from the pressure accumulation chamber 85. And, the communication path 78 is opened near the upper end of the fuel pump 18. Thus, the pressure accumulation chamber 85 is communicated with the inside of the reservoir 16 via the communication path 78.

When the fuel pressure in the reservoir 16 becomes high, the diaphragm 83 elastically deforms toward a direction for increasing the volume of the pressure accumulation chamber 85 such that the pressure accumulator 81 stores the fuel pressure of the reservoir 16. Then, when the fuel pressure in the reservoir 16 decreases, the diaphragm 83 elastically deforms toward a direction for decreasing the volume of the pressure accumulation chamber 85 due to an elastic restoring force such that the pressure accumulator 81 discharges the fuel from the pressure accumulation chamber 85 into the reservoir 16. Here, the diaphragm 83 corresponds to "volume variable member" and "elastic volume variable member" in this disclosure. The diaphragm 83 can be replaced with a bellows.

Figure 5:
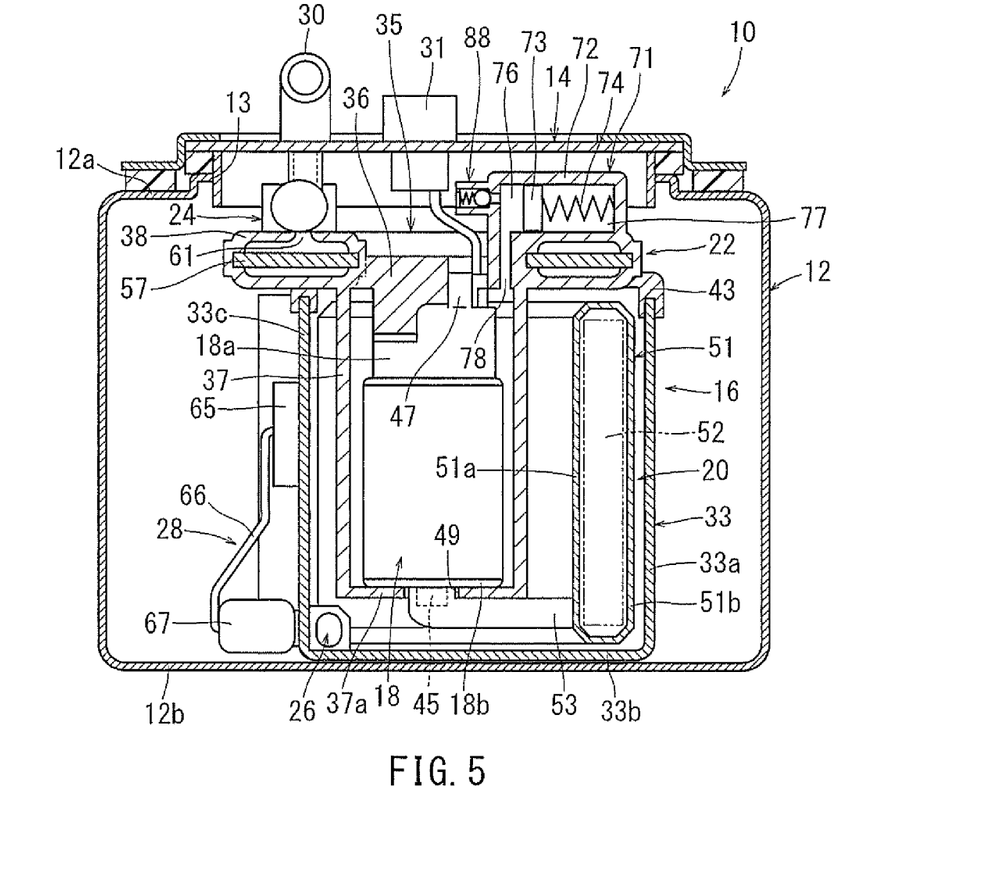
FIG. 5 is a sectional side view of the fuel supply system according to a third embodiment.

A third embodiment will be described. FIG. 5 is a sectional side view of the fuel supply system 10 of the third embodiment. As shown in FIG. 5, a relief valve 88 is provided in the cylinder portion 72 of the pressure accumulator 71. The relief valve 88 is configured to keep the inner pressure of the pressure accumulator 71, in detail the pressure accumulation chamber 76, at a predetermined value. The relief valve 88 is closed in a normal condition. When the accumulated inner pressure of the pressure accumulator 71 increases above a predetermined value, the relief valve 88 is opened in order to discharge the fuel from the inside of the pressure accumulation chamber 76 to the outside of the reservoir 16. Accordingly, because the relief valve 88 can keep the inner pressure of the pressure accumulation chamber 76 at the predetermined value, an excessive pressurization of the inner pressure of the pressure accumulation chamber 76 can be prevented.

Figure 6:
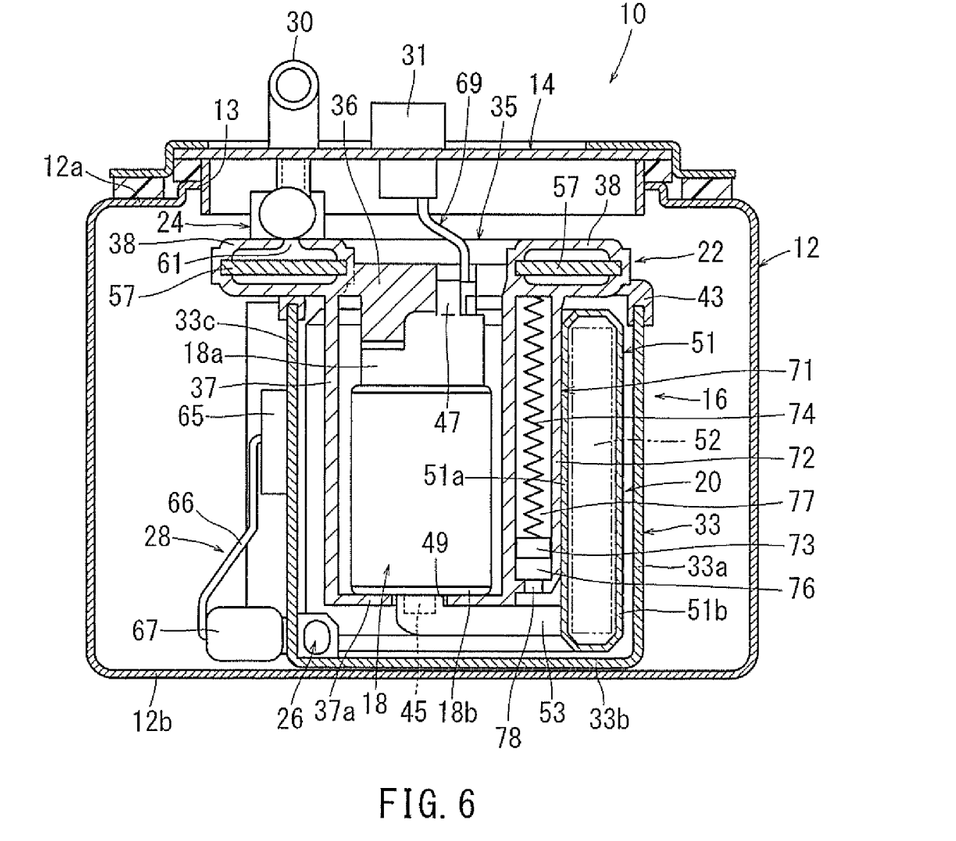
FIG. 6 is a sectional side view of the fuel supply system according to a fourth embodiment.

A fourth embodiment will be described. FIG. 6 is a sectional side view of the fuel supply system 10 of the fourth embodiment. In this embodiment, the pressure accumulator 71 is vertically located on the outer circumferential side of the pump case portion 37 of the cover 35. The pressure accumulation chamber 76 is positioned on the lower side, and the back pressure chamber 77 is positioned on the upper side. The communication path 78 is composed of an aperture opening at a wall on the lower end side of the cylinder portion 72. In accordance with this embodiment, the maximum volume of the pressure accumulation chamber 76 of the pressure accumulator 71 can be easily increased.

Figure 7:
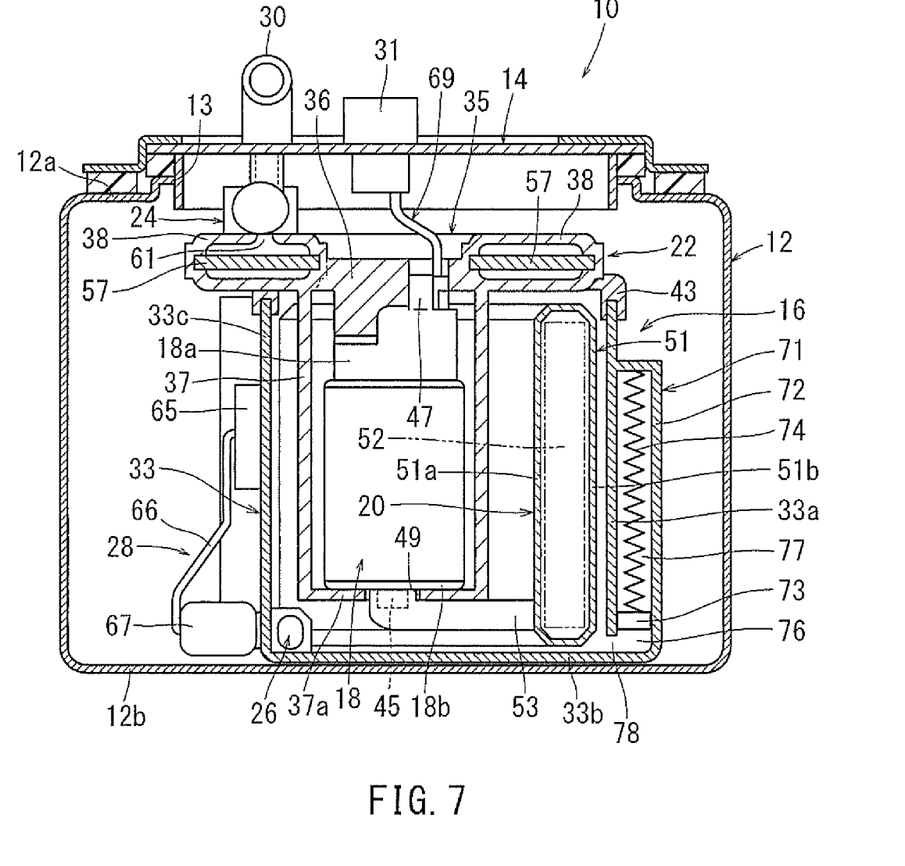
FIG. 7 is a sectional side view of the fuel supply system according to a fifth embodiment.

A fifth embodiment will be described. FIG. 7 is a sectional side view of the fuel supply system 10 of the fifth embodiment. As shown in FIG. 7, the pressure accumulator 71 is vertically located on the outer side of the circumferential wall 33a of the reservoir cup 33. The pressure accumulation chamber 76 is positioned on the lower side, and the back pressure chamber 77 is positioned on the upper side. The communication path 78 is composed of an aperture opening at a lower end of the circumferential wall 33a of the reservoir cup 33. In accordance with this embodiment, the maximum volume of the pressure accumulation chamber 76 of the pressure accumulator 71 can be easily increased.

The fuel supply system of this disclosure can be modified without departing from the scope of this disclosure. For example, the fuel transfer can be composed of any type pumps other than the jet pump 26. The jet pump 26 can use the fuel discharged from a vapor jet of the fuel pump 18 as the drive fuel or can use the fuel separated from the discharge fuel from the fuel pump 18 as the drive fuel.

The invention claimed is:

1. A fuel supply system for a vehicle having an internal combustion engine and a fuel tank, comprising:
   a reservoir located in the fuel tank and hermetically sealed;
   a fuel pump configured to suck fuel from the reservoir and to supply the fuel to the internal combustion engine;
   a suction filter filtering the fuel sucked by the fuel pump;
   a fuel transfer configured to transfer the fuel from the fuel tank into the reservoir and to pressurize the fuel in the reservoir; and
   a pressure accumulator connected to the reservoir in order to control a pressure of the fuel in the reservoir.

2. The fuel supply system according to claim 1,
   wherein the pressure accumulator has a pressure accumulation chamber for receiving the fuel from the reservoir,
   wherein the pressure accumulator has a volume variable member configured to change an inner volume of the pressure accumulation chamber, and
   wherein the volume variable member is elastically biased in a direction for decreasing the inner volume of the pressure accumulation chamber.

3. The fuel supply system according to claim 1,
   wherein the pressure accumulator has a relief valve configured to keep an inner pressure of the pressure accumulation chamber at a predetermined value.

4. The fuel supply system according to claim 1,
   wherein the fuel transfer is a jet pump transferring the fuel by using a flow of the fuel that is discharged from the fuel pump and that is not supplied to the internal combustion engine.

\* \* \* \* \*